US012560331B2

(12) United States Patent
Yanchunas

(10) Patent No.: US 12,560,331 B2
(45) Date of Patent: Feb. 24, 2026

(54) INTEGRATED TRUCK BED MOBILE GRILLING DEVICE

(71) Applicant: Adam Yanchunas, Jacksonville, FL (US)

(72) Inventor: Adam Yanchunas, Jacksonville, FL (US)

( * ) Notice: Subject to any disclaimer, the term of this patent is extended or adjusted under 35 U.S.C. 154(b) by 387 days.

(21) Appl. No.: 18/367,190

(22) Filed: Sep. 12, 2023

(65) Prior Publication Data
US 2025/0084995 A1    Mar. 13, 2025

(51) Int. Cl.
| | |
|---|---|
| *F24C 1/16* | (2021.01) |
| *A47J 37/07* | (2006.01) |
| *B60N 3/16* | (2006.01) |
| *F24C 3/12* | (2006.01) |
| *F24C 15/18* | (2006.01) |

(52) U.S. Cl.
CPC ............. *F24C 1/16* (2013.01); *A47J 37/0713* (2013.01); *A47J 37/0763* (2013.01); *A47J 37/0786* (2013.01); *B60N 3/16* (2013.01); *F24C 3/126* (2013.01); *F24C 15/18* (2013.01)

(58) Field of Classification Search
CPC ............... A47J 37/0713; A47J 37/0786; A47J 37/0763; B60N 3/16; F24C 1/16; F24C 15/18; F24C 3/126
See application file for complete search history.

(56) References Cited

U.S. PATENT DOCUMENTS

| | | | | |
|---|---|---|---|---|
| 6,116,673 A | * | 9/2000 | Clonan | ..................... B60R 9/00 |
| | | | | 296/3 |
| 8,776,778 B1 | | 7/2014 | Brown | |
| 10,017,092 B1 | | 7/2018 | Chastain | |
| 10,174,952 B1 | | 1/2019 | King | |
| 10,899,282 B2 | | 1/2021 | Aplin | |
| 11,648,880 B1 | * | 5/2023 | Roise | ......................... B60R 7/00 |
| | | | | 126/26 |
| 2010/0031950 A1 | * | 2/2010 | Paslawski | ................. F25D 3/08 |
| | | | | 126/25 R |
| 2010/0096876 A1 | | 4/2010 | Fletcher | |
| 2012/0080467 A1 | * | 4/2012 | Irwin | ....................... B60N 3/16 |
| | | | | 224/403 |
| 2014/0366861 A1 | | 12/2014 | Johnson | |
| 2018/0162430 A1 | * | 6/2018 | deVarona | .................. B62B 3/10 |
| 2022/0250531 A1 | | 8/2022 | Mundt | |

* cited by examiner

*Primary Examiner* — Alfred Basichas
(74) *Attorney, Agent, or Firm* — Lawrence J. Gibney

(57) ABSTRACT
A grilling surface that can be mounted to a tailgate of a pickup truck bed is capable of being moved along the surface of the truck bed from the back of the truck bed near the can to the tailgate using a track system. The device would be stowed near the front of the passenger space of the pickup truck during normal operation but can be moved along the truck bed to the tailgate area when the grill is to be used. A single storage device or a pair of storage devices will be placed adjacent to the grill surface and will house either dry goods or goods that need to be chilled. A grease trap that can be removed and emptied is located below the grill surface. The lid which covers the grilling surface is removable and can provide a surface for a table. Appropriate safety features such as quick connect lines and temperature monitoring devices and alarms will be incorporated into the device.

7 Claims, 9 Drawing Sheets

INTEGRATED TRUCK BED MOBILE GRILLING DEVICE

BACKGROUND OF THE INVENTION

A. Field of the Invention

This relates to entertainment or leisure activities specifically using or centering around a mobile gas barbecue grilling system. Many barbecue mobile gas barbecue systems are portable, but this is a device that will mount to the bed of a truck bed, much like a toolbox that is common to many truck beds. The grill will rest on a track system which will allow the device to be moved back and forth and be locked in place against the bed of the truck for safe and secure storage while in transit. Once the device has transitioned to the tailgate area, it can be lowered into the functional position for use.

Additionally, the lid of the device is intended to be removed with the use of quick release hinges. The lid has legs integrated on the underside so that once removed it can function as a table.

The shape of the device will be designed to accommodate the cutouts for the wheel wells that are found on many truck beds. Pickup trucks have unique designs including the placement of the wheel wells and this device will be manufactured to make sure that this device can be placed on any pickup bed and can move from the front end of the truck bed to the tailgate area of the truck bed. There will be several different embodiments to include a grilling surface and a cooler on the left side of the grilling surface, a grilling surface, and a cooler on the right side of the grilling surface and a grilling surface and coolers on both sides of the grilling surface. The coolers will be used to house either the meats to be grilled or the drinks and ice that will be consumed during the tailgate festivities. Appropriate precautions will be made so that the heat transfer from the grilling surface does not destroy the useful life of the cooler or damage its effectiveness. Additionally, the safety precautions (thermal barrier) and accommodations will serve as protection against heat transfer into the grill chassis. A heat monitoring device such as a digital thermometer will monitor and report back to the digital display through a blue tooth connection the heat of the area in the grill chassis to prevent overheating of the grill while in use. A grease trap will be provided and all the necessary connections—including a fuel source—to operate the grill will also be incorporated into this design. The device will also have a way to lock in the device to the back of the pickup bed to prevent movement of the device during normal highway traffic and to prevent vandalism.

B. Prior Art

There are other prior art references to portable grilling systems and a representative example that is found in the prior art is Brown, U.S. Pat. No. 8,776,778. The Brown reference is mounted to a pickup truck bed and will move from the rear of the truck bed to the tailgate area for use. The Brown reference, however, does not incorporate the use of coolers on either or both sides of the device and the Brown device does not anticipate their use. Additionally, the Brown device does not illustrate the use of a grease trap that will be needed to dispose of the grease that will be produced during grilling. The Brown reference also does not include a digital display, onboard power connection, blue tooth connection, heat monitoring device, removable lid over the grilling surface that will function as a table and an onboard safety kit.

BRIEF SUMMARY OF THE INVENTION

This pick-up truck mounted mobile gas barbecue grilling system will be mounted to the bed of a pick-up truck, much like a toolbox; the device will extend from one side of the truck bed to the opposite side of the truck bed. The device will provide access to propane and LP gas or other gas systems that will power the grilling equipment.

A track system that is found on the sides of the pickup bed truck is provided and will allow the device to be moved from the back of the truck bed near the rear of the cab to the tailgate portion in a position to use the device. The track system will allow the device to be locked in place at the time of the appropriate positioning. These tracks will allow the grill system to move back and forth and be positioned at the appropriate position on the truck bed. Ideally the support members of the track system will be installed on the inside surfaces of the truck bed to ensure that the tailgate operates normally and without interference from the track system.

There will be three separate embodiments, but all capture the essence of the concept. The first embodiment will position the grilling surface in the approximate middle of the device with two coolers on either side of the grilling surface. A second embodiment will position the grilling surface in the approximate middle of the device with a cooler to the right of the grilling surface; the third embodiment will position the grilling surface in the approximate middle of the device with a cooler to the left of the grilling surface. Each of the coolers can be removed to clean the cooler or replace a damaged cooler. Each cooler or cooler module can be replaced with either an additional grilling surface, burner surface or refrigeration unit or freezer unit at the discretion of the end user.

Regardless of the embodiments all three variations will move from the back of the rear of the truck to the tailgate area. There are many different truck brands and each brand positions wheel wells on the vehicle. This device will allow the device to move from the rear of the truck bed to the tailgate area with relative ease. The device will be constructed with an approximate three inch gap between the underside of the lid and the top of the lids for the coolers and grill; this space will allow the user to store folding stools or grilling equipment when the lid is closed.

Each of the coolers will be provided with a drain to provide a means to clean out any condensation or melted ice from the coolers. Appropriate insulation will be provided between the grilling surface and the coolers to prevent damage to the coolers from the anticipated extreme heat that will be generated during the cooking process.

A grease trap is provided that can be removed and emptied and then replaced. A handle may also be provided to move the device along the bed of the truck. Additionally, the device may also be stored in a compartment below the deck on a pickup bed truck to completely obscure the view of the device during normal travel.

The device can also be removed from the pickup bed truck if desired while leaving the track system in place.

NUMBERING REFERENCE

2 Truck
5 Device
10 Lid
15 Quick Connector
12 Folding Legs for Table
15 Grill Surface
16 Storage area for safety equipment
17 Grill Surface Lid
20 Cooler A
21 Lid for Cooler A
25 Cooler B
26 Lid for Cooler B
30 Quick Connect for Gas
35 Power Connection
40 Digital Display
50 Burner Controls
55 Grease Trap
60 First Support Bracket
65 Second Support Bracket

DETAILED DESCRIPTION OF THE EMBODIMENTS

Figure 1:
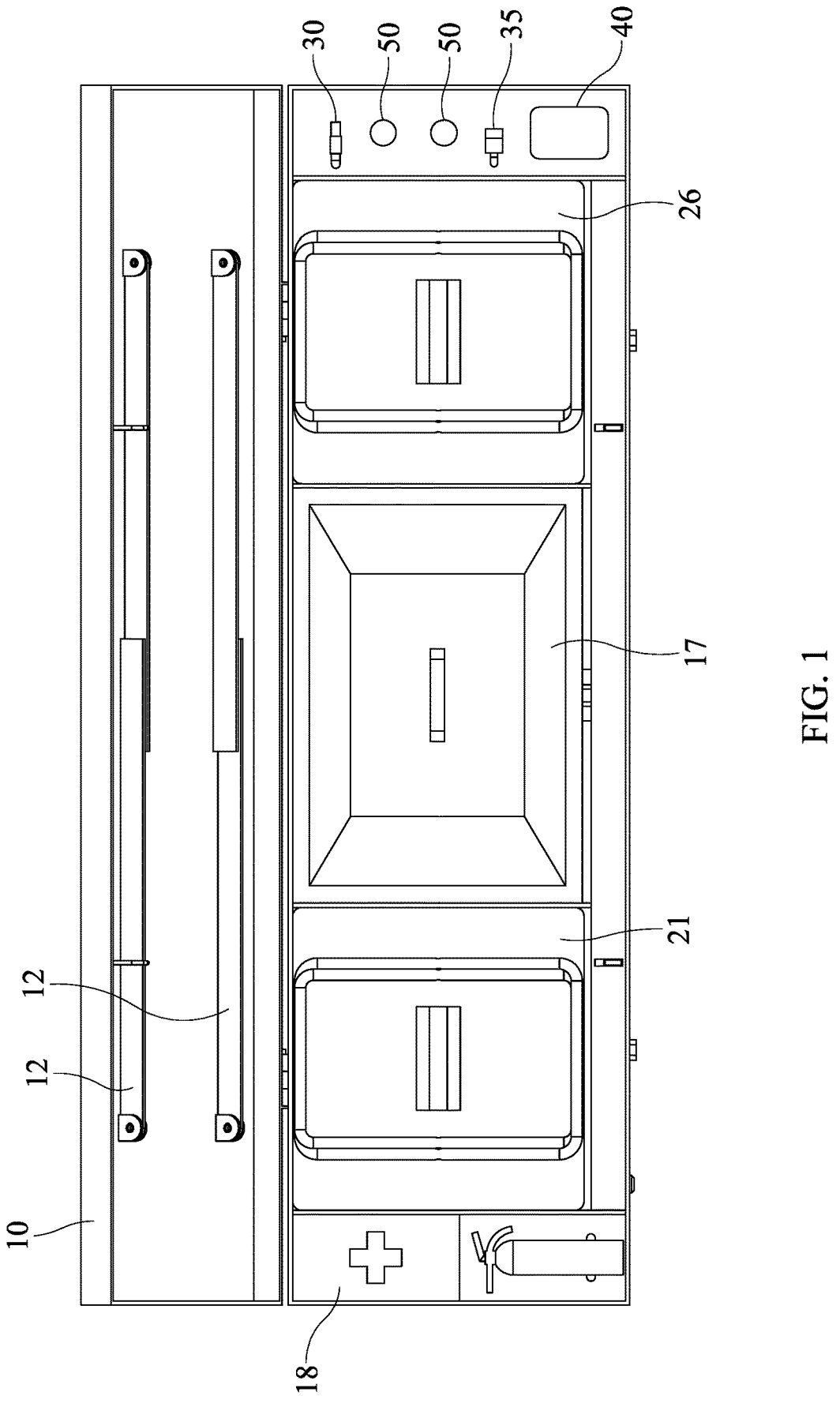
FIG. 1 is a top view of the grill system with the lid open, exposing the grill surface, as well as the coolers and cooler lids on adjacent sides.

As depicted in FIG. 1, this device 5 will have the general shape of a toolbox that can be mounted to the back of a truck bed. A truck bed has defined sides and the device 5 will rest on a rail and chassis system that is installed on the tops of the sides of the truck bed 2; no specific truck or truck bed is being claimed. The device 5 is secured to the rail and chassis system and can move on the rail system from the front end of the pickup bed near the cab to the tailgate area. The device 5 will be secured to the back of the pickup truck bed for safety reasons during transport and the track system will enable the user to unlatch the device and move the device to the tailgate area. There are many ways to secure this type of device to the front of the truck bed near the cab of the truck and no specific type of securement device is being claimed. Likewise, there are many types of track systems can be used to move the device 5 from the front of the truck bed near the cab of the truck to the tailgate area and no specific type is being claimed.

As depicted in FIG. 1 when the lid 10 is opened there will be a grilling surface 15 on the top interior in the proximate middle of the interior. A means to secure the gas cylinder that provides fuel to the grill will be provided; the required hoses and connections from the gas cylinder to the grill will also be provided. The grill surface 15 with associated burner controls 50 will be used to prepare the grilled food and a grilling surface lid 17 will be provided to cover the grill surface 15 when the device is not in use. For safety reasons a gas quick connect 30 proximate to the grill surface will be provided. A power outlet 35 will also be provided proximate to the burner controls as well as a digital display 40. The power outlet 35 can be supplied with power from the truck through an interior connection in the truck or be a separate power source. The digital display will allow the temperature of the grilling to be set and timed. Many grilling devices can be operated by phone using remote controls and this feature will also be provided.

The device will incorporate safety features such as an emergency fuel shut off system when the temperature of the grill or proximate to the grilling surface exceeds a predetermined level. Alarms (not depicted) will also be installed to alert the user of a possible dangerous rise in the temperature surrounding the device. As an additional safety measure, it is anticipated that the outside surfaces of the device will be insulated to prevent the transmission of heat to prevent personal injury or property damage.

The lid 10 of the device can be locked in place to prevent the theft of any items and to prevent vandalism. The grilling surface will be positioned slightly lower than the top of the lid 10 surface to allow the lid to completely close and completely cover the upper surface of the device. The toolbox grills must be made of durable material that can withstand all extremes of temperature and be exposed to all environmental conditions.

On opposite sides of the grilling surface will be a first cooler, Cooler A 20, to hold the beverages or ice and a second cooler, Cooler B, 25, to hold food, dry goods, or other staples as examples. The choice of what to store in the respective cooler is left to the discretion of the user of the device. The coolers 20, 25 can be removed from the interior of the device to clean the respective coolers and to substitute other items in the cavity such as a refrigerator if desired. Either of the coolers, 20, 25 may hold items that need to be cooled or items that are stored dry. Both of the coolers, 20, 25 will have cooler lids 21, 26 that can be locked in place during transport such as depicted in FIG. 1. A separate storage space 16 that is separate from the coolers 20, 25 will be provided to store safety items such as a first aid kit and fire extinguisher.

Figure 8:
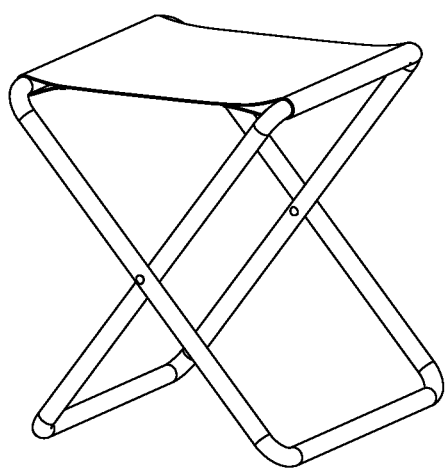
FIG. 8 is an isometric view of a folding chair that is meant to be stowed above the cooler when folded and the lid closed.

The coolers 20, 25 will be designed such that adequate space is provided between the top of the cooler and the underside of the lid 10 to allow storage of folding chairs such as the type depicted in FIG. 8 or grilling equipment.

Figure 2:
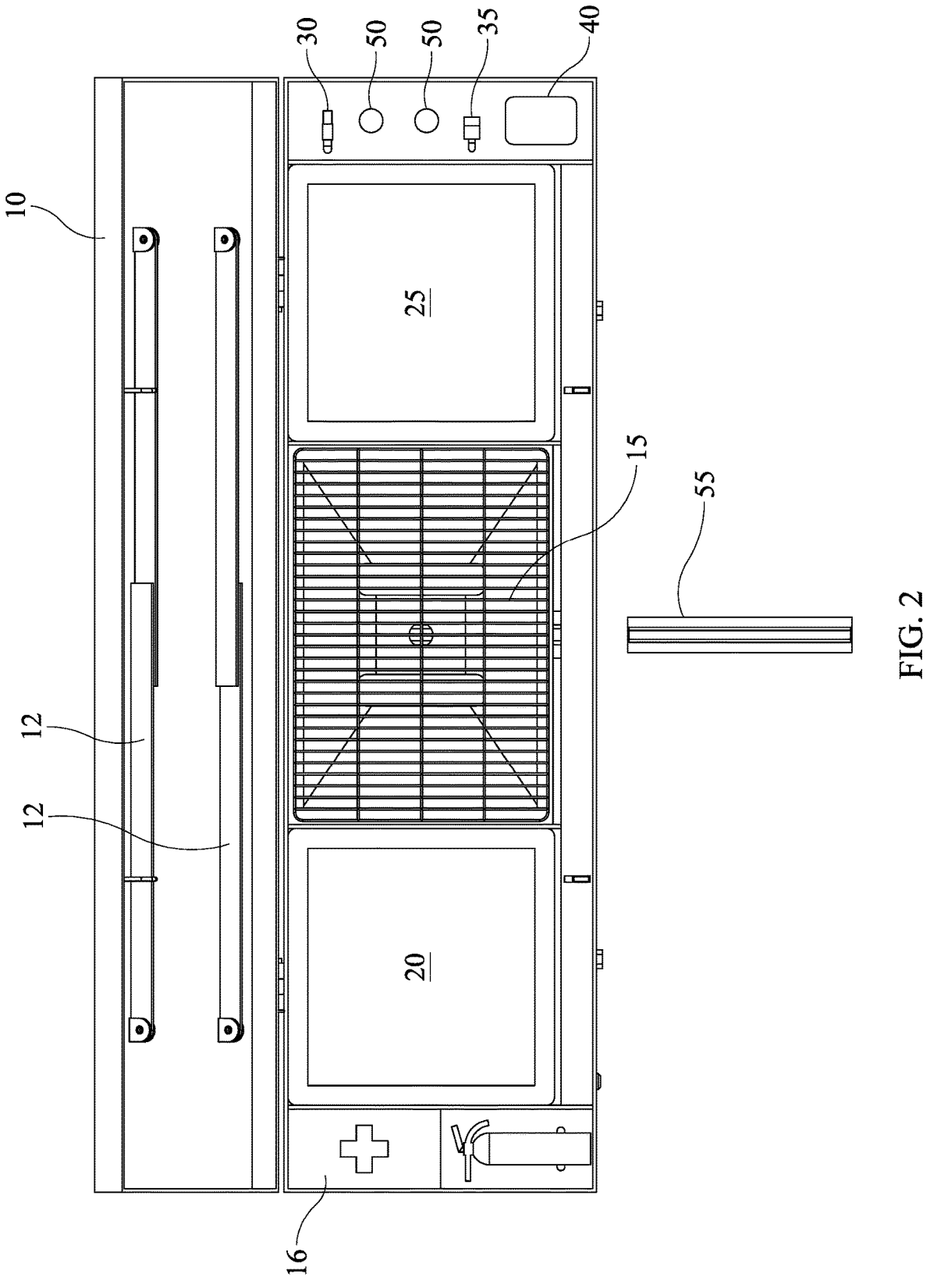
FIG. 2 is a top view of the device with the grill surface lid and cooler lids removed.
Figure 3:
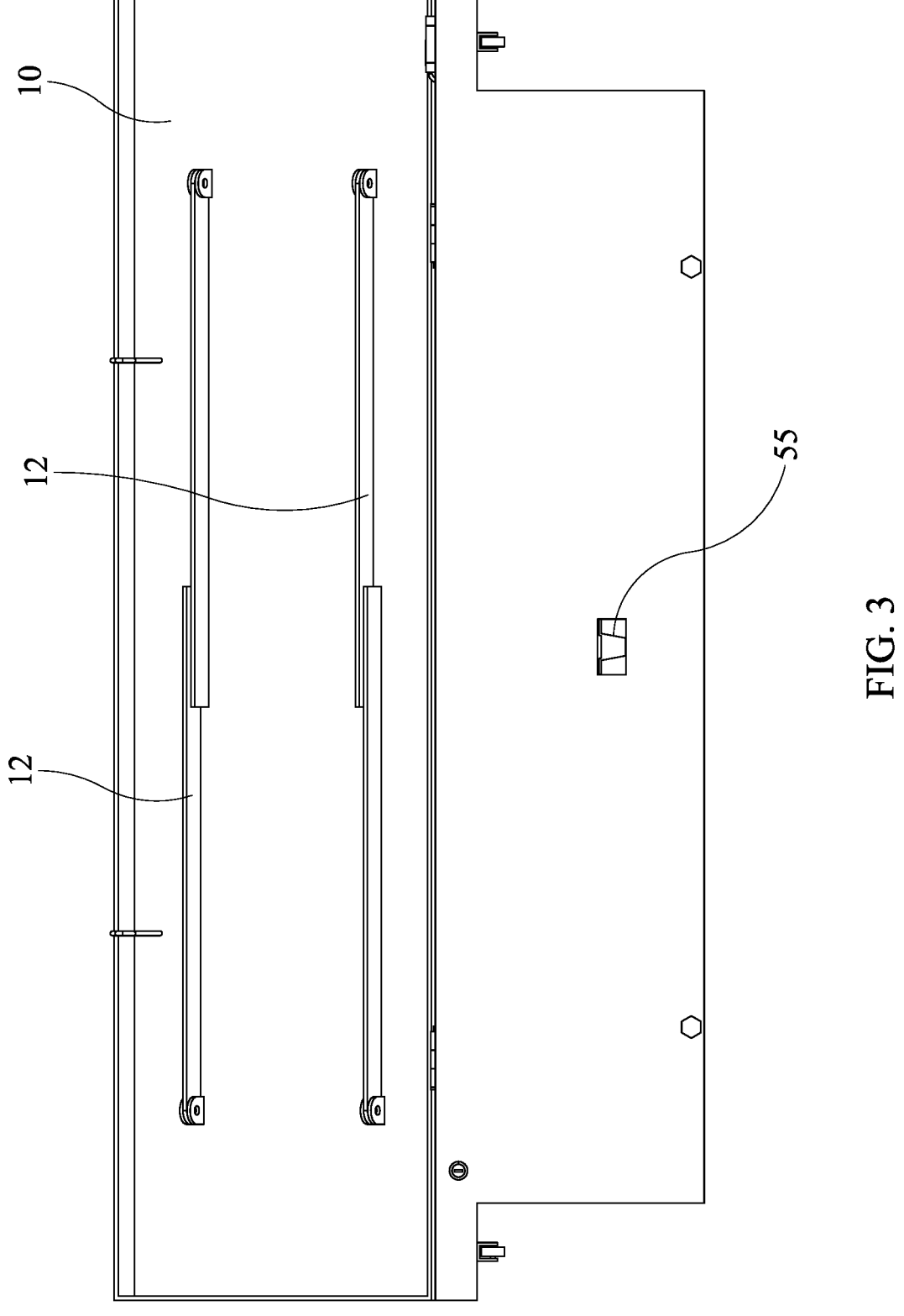
FIG. 3 is a front view of the device with the lid open.
Figure 7:
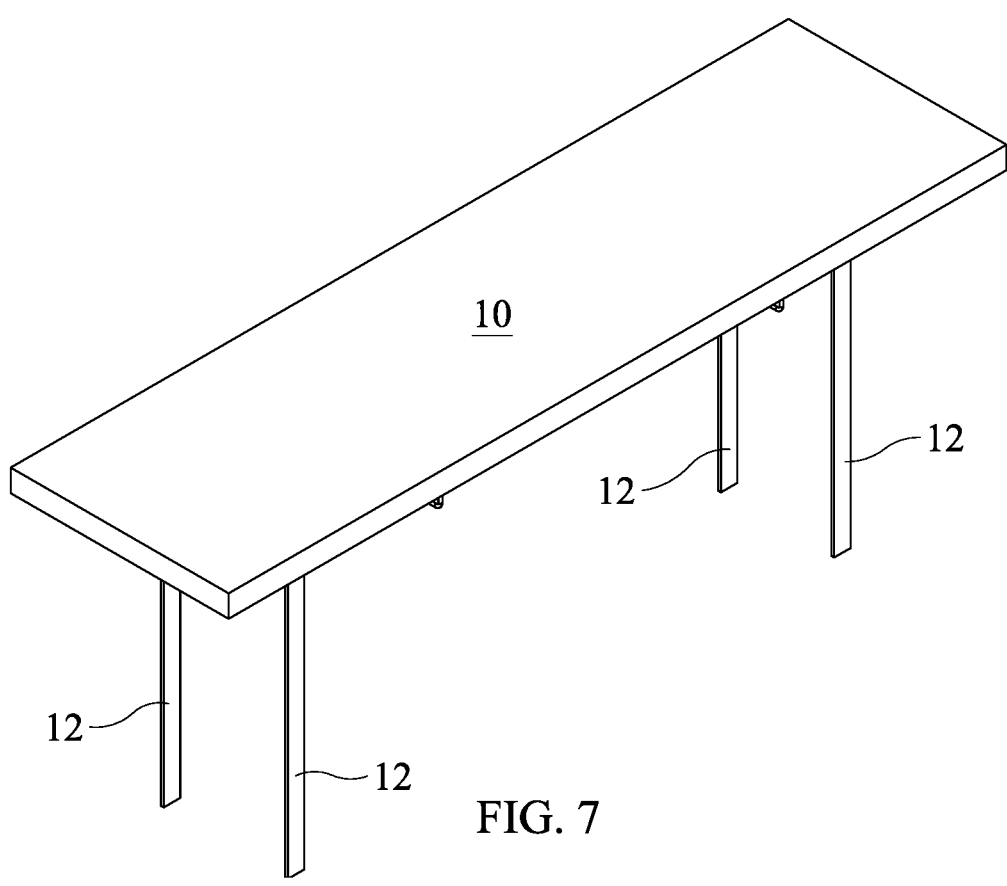
FIG. 7 is a perspective view of the table that is formed by the lid.

The lid 10 that covers the entire device 5 is a solid piece and will fit over the entire surface of the interior of the device; the lid 10 is removable. A pair of legs 12 will be mounted to the underside of the lid 10 such as depicted in FIG. 2; the pair of legs will be hinged to the underside of the lid 10. When the lid is removed, the legs 12 can be folded out to provide a table or platform such as depicted in FIG. 7 for the user of the device. After the user no longer wishes to use the table or platform that is formed by the lid 10 the user folds the legs 12 and reattaches the lid to the top of the device 5.

It is anticipated that extreme heat will be generated during the grilling process and insulating material (not depicted) will be proximate to Cooler A and Cooler B to prevent the transfer of heat from the grilling surface to the interior of the respective Coolers A and B. The coolers and the grill surface will be slightly below the top surface of the lid surface to enable the user to completely close the lid over the grilling surface and coolers. On the interior of the device 5 a pair of locks to lock the lid will be provided. The locks will not be exposed when the lid is closed. The use of locks to secure this type of device is not novel and no specific type of lock is being claimed.

A grease trap 55 will be provided on the bottom of the device below the grilling surface so that the grease, which is inevitable, can be collected. The grease trap is removable and can be emptied and cleaned and replaced as needed.

A track system on either side of the truck bed top surface will be provided. A corresponding footer will be placed on the bottom of the surface of the device and will interlock with the track system along the length of the truck bed. No specific track system is being claimed but the purpose of the track system is to enable the user to easily move the device 5 from the front of the truck bed to the tailgate area along the sides of the truck bed.

Pickup trucks have wheels and many pickup trucks have wheel wells that extend into the surface of the truck bed. The device will be designed such that the outside surface of the device will be designed to extend over the wheel wells in the truck bed. The bottom surface of the device will be beveled inward on either side so the device may easily pass over the wheel wells in many standard truck beds. The specific configuration for a truck bed will be altered to the design of a specific pickup bed truck.

Figure 4:
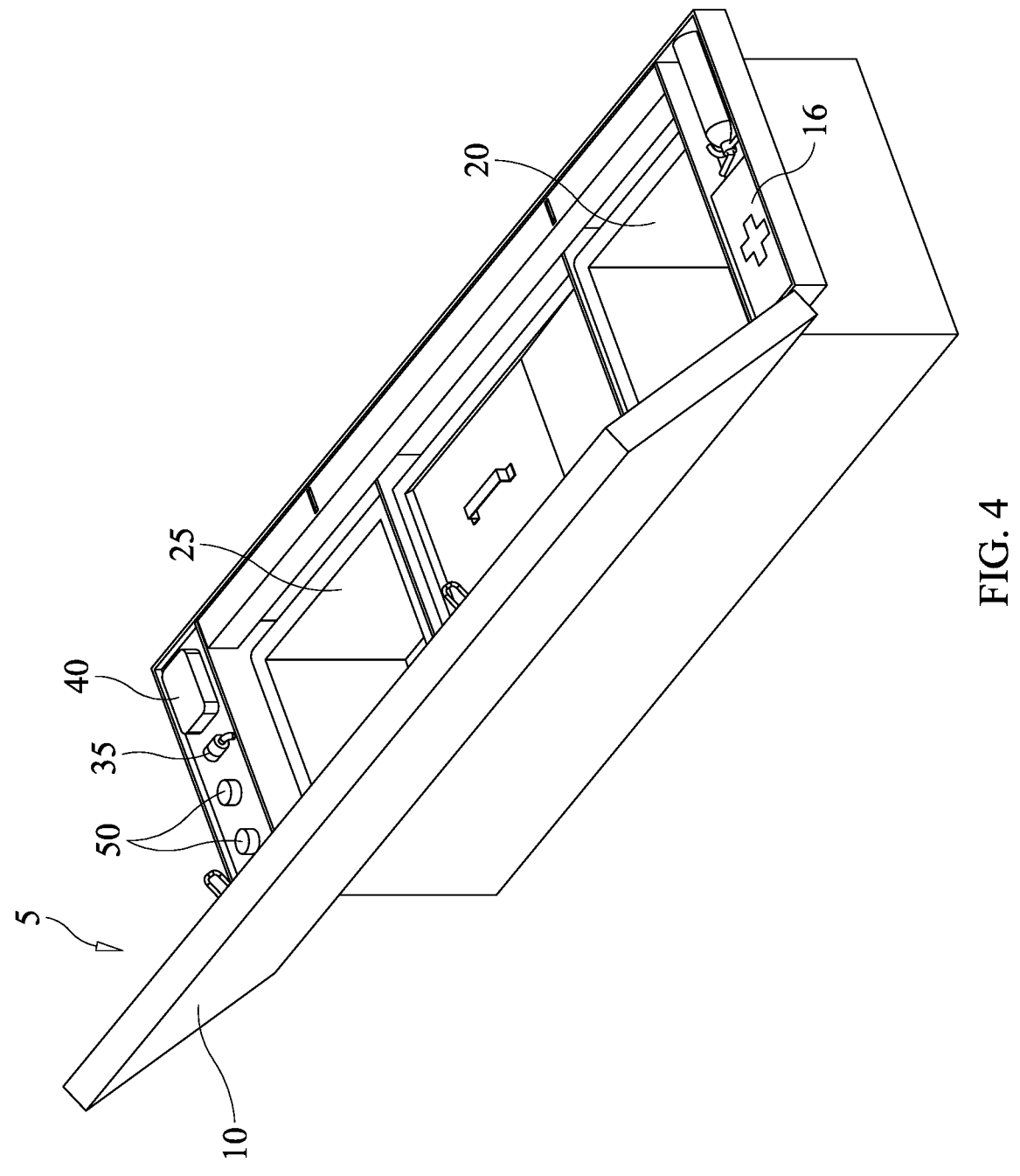
FIG. 4 is rear perspective view of the device with the lid open.
Figure 4A:
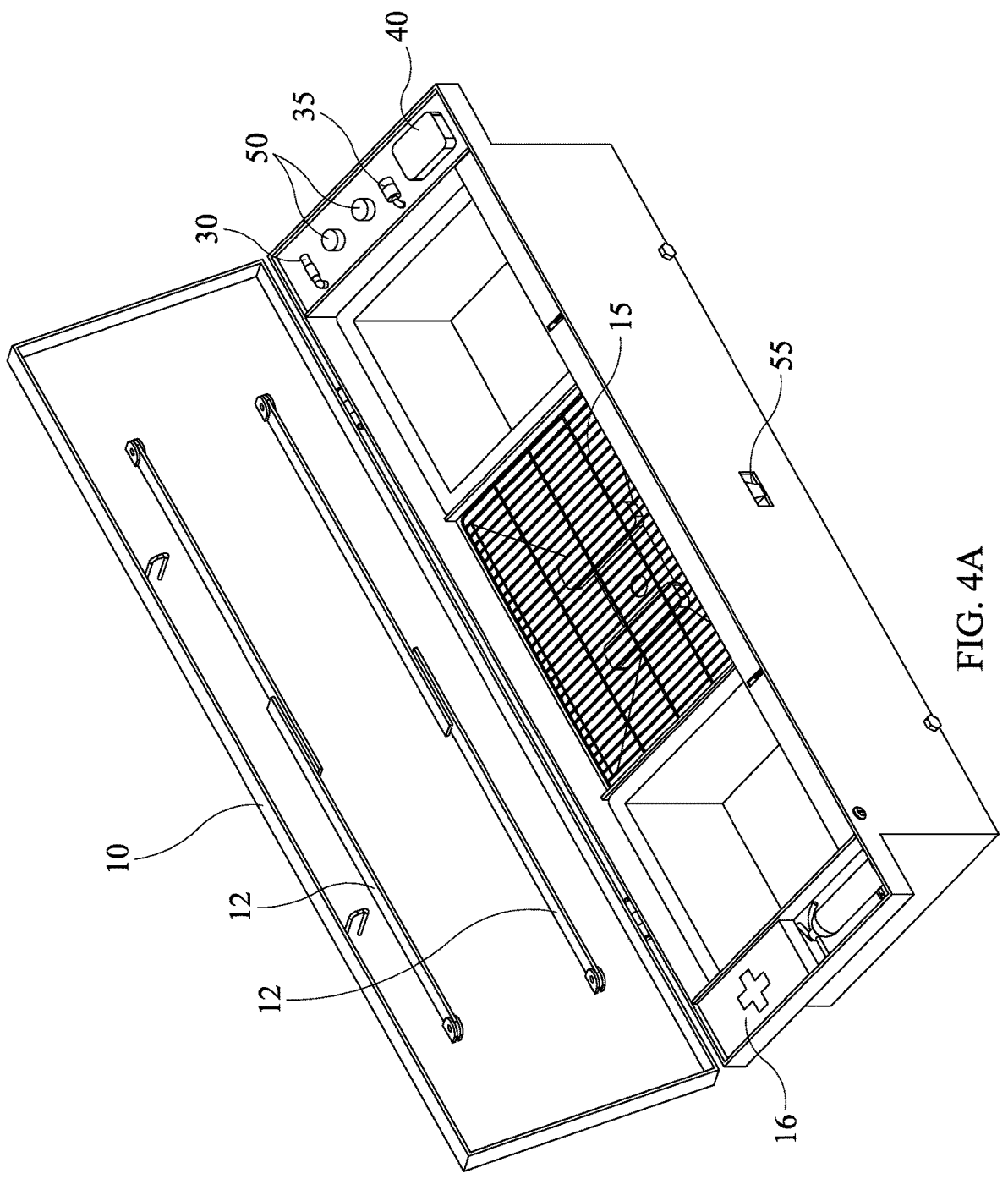
FIG. 4A is a front isometric view of the device with the lid open

After the device is moved from the front of the truck bed along the track system such as depicted in FIG. 4, a first carriage support arm 60 and a second carriage support arm 65 is provided; the carriage support arms are positioned on the inside of the truck bed to allow the tailgate to function normally. The first and second carriage support arms 60, 65 are mounted to the interior surface of the sides of the truck bed near the tailgate of the truck. It is contemplated that the carriage support members, which may rotate or telescope will be specifically designed depending on the type of truck to allow the tailgate to operate normally when the device 5 is not being used. Each of the carriage support arms will have defined top, bottom, and side surfaces. The device 5 will slide on the top surface of the respective carriage support arms 60, 65. Once the device is resting on the respective carriage support arms, the device 5 can be locked in place for safety reasons; the specific type of locking means is not being claimed but it is imperative that the device rests securely on top surface of the carriage support arms and be able to support the weight of the device.

Figure 5:
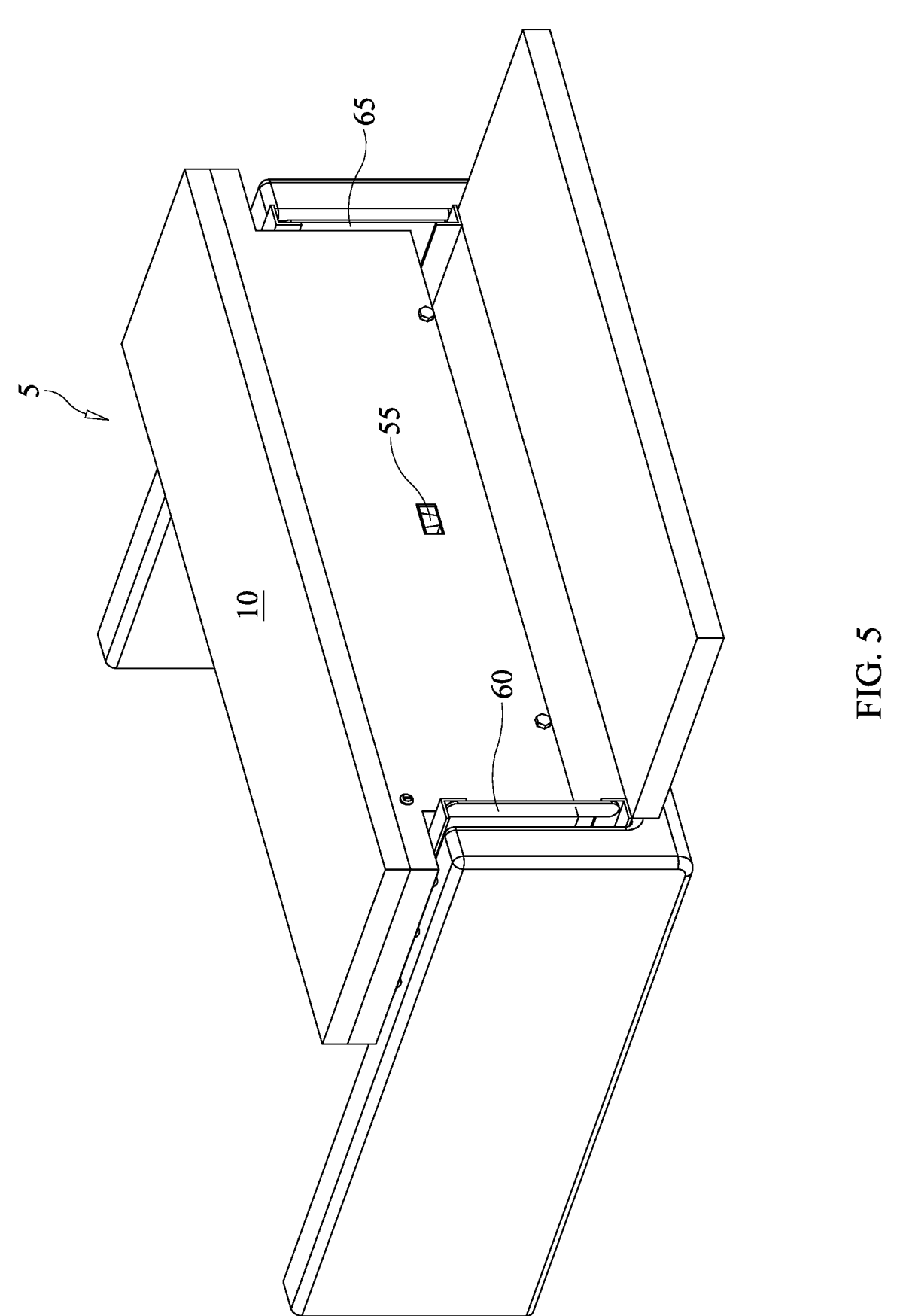
FIG. 5 is a perspective view of the device on the truck bed near the tailgate with the carriage system.
Figure 6:
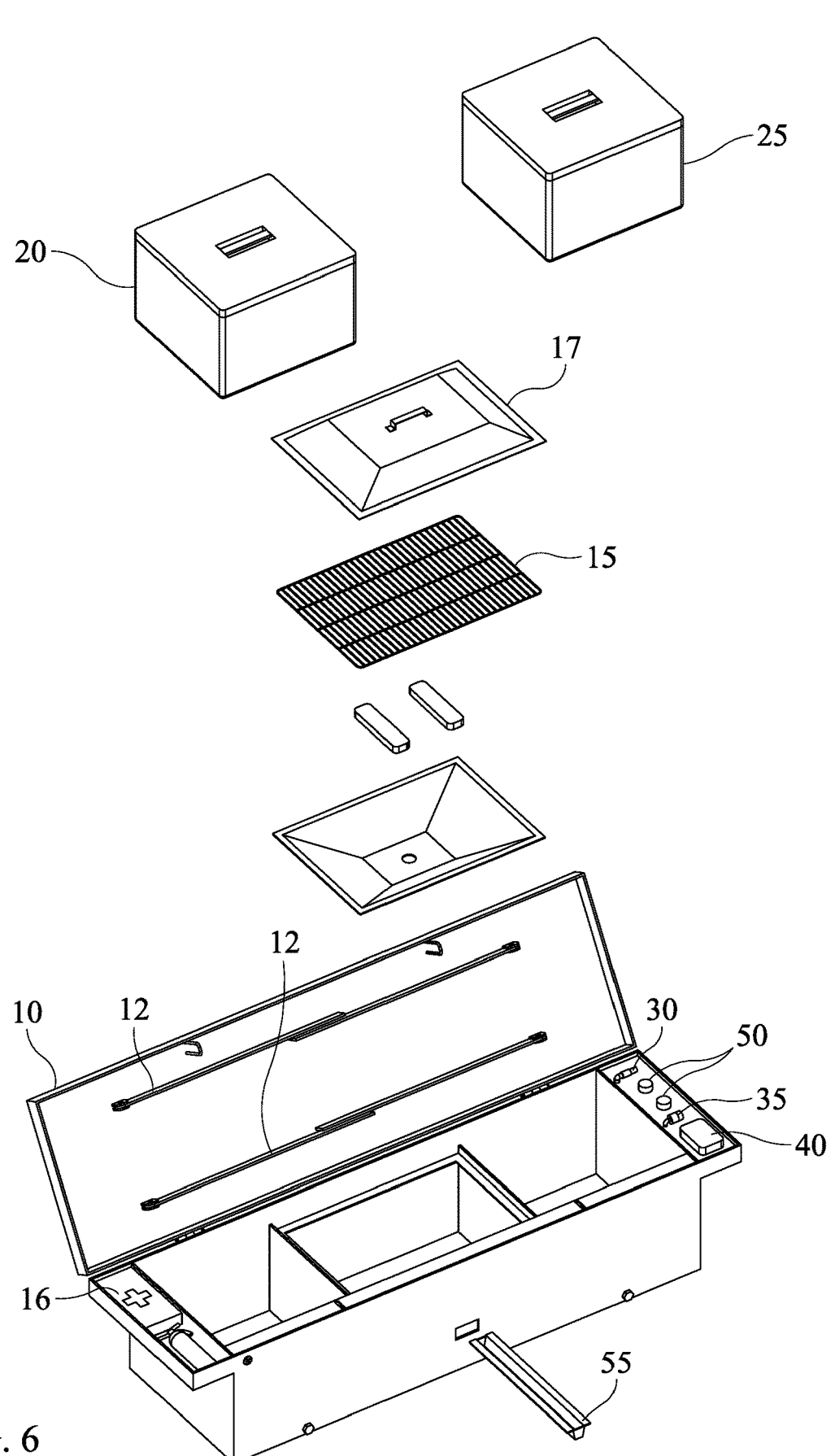
FIG. 6 is an exploded view of the parts of the device.

After the device 5 is locked into position on the top surface of the carriage support arms, the carriage supports arms 60, 65 can be folded so that the device can be lowered toward the ground such as depicted in FIG. 5. It is anticipated that the device will not rest on the ground but will be positioned at a functional height for use beyond the deployed tailgate. After the device is no longer used the device can be raised to the level of the sides of the truck bed and moved to the front of the tailgate and secured.

ALTERNATIVE EMBODIMENTS

The first embodiment teaches a grilling surface in the proximate middle of the device with a cooler on both sides of the grilling surface. In the alternative embodiments a single cooler or storage unit will be provided and placed adjacent to the grilling surface, to the left or right of the grilling surface at the user's discretion. Alternatively, the user may decide to add burners and add grilling surface area.

After a cooler is removed, the user may also decide to add a refrigerator/freezer in the cooler space as an alternative.

Figure 9:
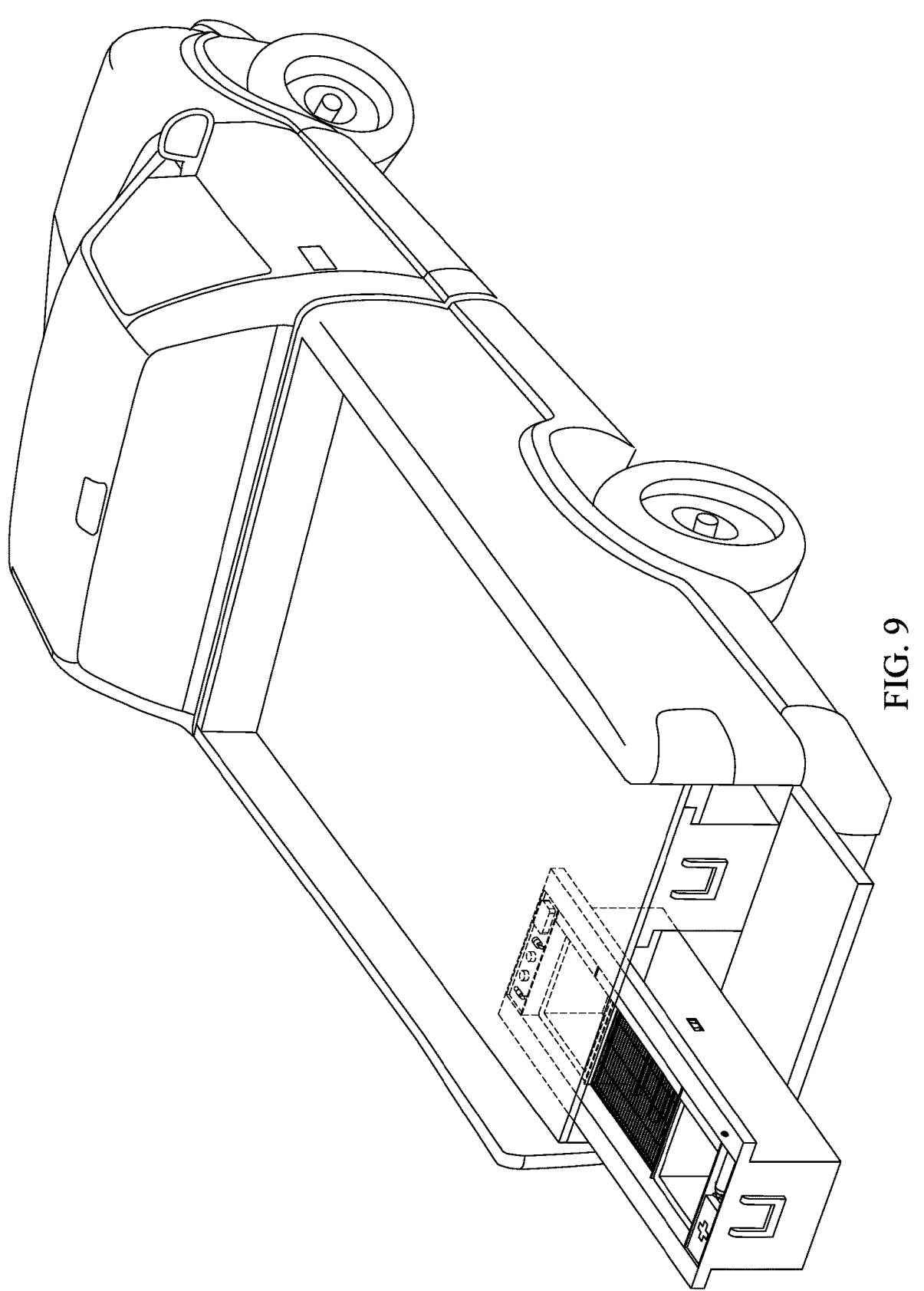
FIG. 9 is an alternative storage method for the device under a platform on the truck bed in which the entire device would be stowed under the deck and all the features of the device remain in place with no affect on the operation of the device.

As depicted in FIG. 9 the device can be stored under a deck that is part of the bed of the truck. In this embodiment, the device 5 is hidden completely from view by the deck on the truck bed when the device is stowed under the deck of the truck. The entire device will be stowed in the space created by the cavity for the device. The operation of the grill and the arrangement of the spaces on the device will not be altered by this embodiment.

While the embodiments of the invention have been disclosed, certain modifications may be made by those skilled in the art to modify the invention without departing from the spirit of the invention.

The inventor claims:

1. A truck bed grill, which is comprised of
a structure with defined dimensions,
wherein the structure can be mounted to a back of a truck bed,
a grill,
a grilling surface,
wherein the grilling surface is placed in an interior of the structure,
wherein the grilling surface is placed below an upper edge of the interior of the structure, burner controls,
wherein the burner controls operate the grill,
a fuel source,
wherein the fuel source provides the fuel to operate the grill,
wherein hoses are provided to provide fuel to the grill,
a quick connect release,
wherein the quick connect release is provided for the fuel source,
a digital display,
a grilling surface lid,
a pair of coolers,
wherein the pair of coolers are proximate to the grilling surface lid,
wherein insulating material is provided between the grilling surface lid and the pair of coolers,
wherein a drain is provided for each of the coolers,
a safety equipment storage space,
an emergency fuel shut off,
wherein the emergency fuel shut off is triggered at a predetermined event,
an alarm,
wherein the alarm is activated at the predetermined event,
a lid,
wherein the lid is removable,
wherein a plurality of legs are attached to an underside of the lid,
wherein the plurality of legs are attached to the underside of the lid with a hinge,
wherein the plurality of legs can rotate,
a grease trap,
wherein the grease trap can be removed,
a track system,
wherein the track system is mounted to the sides of the truck bed;
a first carriage support arm,
wherein the first carriage support arm is secured to the truck bed,
a second carriage support arm,
wherein the second carriage support arm is secured to the truck bed,
wherein the carriage support arms can be folded.

2. A truck bed grill as described in claim 1 wherein the coolers are removable.

3. A truck bed grill as described in claim 1 wherein a single cooler is placed to the right of center proximate to the grilling surface.

4. A truck bed grill as described in claim 1 wherein a single cooler is placed to the left of center proximate to the grilling surface.

5. A truck bed grill as described in claim 1 wherein the digital display displays the temperature of the grill.

6. A truck bed grill as described in claim 1 wherein a timer is provided on the digital display.

7. A truck bed grill as described in claim 1 wherein the digital display allows remote control.

\* \* \* \* \*